(12) United States Patent
Scala et al.

(10) Patent No.: US 11,817,247 B2
(45) Date of Patent: Nov. 14, 2023

(54) AUTOMATIC CALIBRATION SYSTEM AND METHOD FOR PASSIVE LOW-POWER VOLTAGE TRANSFORMER

(71) Applicant: G & W ELECTRIC COMPANY, Bolingbrook, IL (US)

(72) Inventors: Elisa Scala, Bologna (IT); Andrea Nalli, Rovigo (IT); Simone Pezzolato, Jolanda di Savoia (IT)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 0 days.

(21) Appl. No.: 17/581,484

(22) Filed: Jan. 21, 2022

(65) Prior Publication Data

US 2023/0238165 A1   Jul. 27, 2023

(51) Int. Cl.
  *H01H 47/00* (2006.01)
  *H01F 21/00* (2006.01)
  *H01F 38/20* (2006.01)
  *H01F 7/06* (2006.01)

(52) U.S. Cl.
  CPC ............ *H01F 21/00* (2013.01); *H01F 7/064* (2013.01); *H01F 38/20* (2013.01)

(58) Field of Classification Search
  None
  See application file for complete search history.

(56) References Cited

U.S. PATENT DOCUMENTS

| 9,859,862 | B2 | 1/2018 | Sevcik et al. |
| 11,460,872 | B2* | 10/2022 | Kerr .................... G01R 19/0084 |
| 2018/0026448 | A1* | 1/2018 | Falk ........................ H02M 7/54 |
| | | | 307/7 |
| 2020/0159266 | A1 | 5/2020 | Kerr et al. |

FOREIGN PATENT DOCUMENTS

| CN | 1912638 A | 2/2007 |
| WO | 2019113932 A1 | 6/2019 |
| WO | 2021059078 A1 | 4/2020 |

OTHER PUBLICATIONS

International Search Report and Written Opinion for Application No. PCT/US2023/060917 dated May 11, 2023 (12 pages).

* cited by examiner

*Primary Examiner* — Stephen W Jackson
(74) *Attorney, Agent, or Firm* — Michael Best & Friedrich LLP (57) ABSTRACT

Systems and methods for calibrating a low-power voltage transformer (LPVT). Systems include a capacitive voltage divider and a variable capacitance device connected to the capacitive voltage divider. A parameter of the variable capacitance device is adjusted to minimize the ratio error of the LPVT. Methods include connecting a variable capacitance device to a capacitive voltage divider of the LPVT system, measuring a ratio error of the LPVT system based on an output of the variable capacitance device, and adjusting a parameter of the variable capacitance device.

18 Claims, 9 Drawing Sheets

AUTOMATIC CALIBRATION SYSTEM AND METHOD FOR PASSIVE LOW-POWER VOLTAGE TRANSFORMER

FIELD OF DISCLOSURE

Embodiments described herein relate to electric power distribution networks. More particularly, embodiments described herein relate to systems and methods for automatically calibrating a passive low-power voltage transformer (LPVT).

SUMMARY

Low-power passive voltage transformers (LPVT) are used within electrical power transmission systems to transform high-voltage power received from a high-voltage electrode to low-voltage power suitable for consumer uses. Newly manufactured LPVT include both a transformation ratio rated by a manufacturer of the LPVT and a real transformation ratio specific to the LPVT, based on actual construction and operating parameters. While the rated and real transformation ratios are often similar, a gap between the two is almost always present. As transmission systems are designed based on the rated transformation ratios, it is beneficial to adjust the real transformation ratio to match the rated transformation as closely as possible.

LPVT are constructed according to certain standards, such as IEC 61869-11. Some standards state that LPVT may use coefficients to correct the real transformation ratio with respect to the rated transformation ratio. Many LPVT implement an Intelligent Electronic Device (IED) including a software platform configured to correct the real transformation based on a correction factor. A user of the IED can set the correction factor. However, some modern IEDs are not suited to implement correction functions. In addition, not all end user accept adding this configuration step to the activation process of monitoring systems.

A solution to these problems with IEDs is to calibrate the real transformation ratio of a newly manufactured and/or installed LPVT with a hardware system rather than a software system. An example of this is to design a voltage dividing component of an LPVT to have a secondary arm or branch with an adjustable impedance. With this design, the adjustable impedance functions as the correction factor. An automated test bench can then be used to measure the real transformation ratio of the LPVT, compute the ratio error in real time, and adjust the impedance value by predefined steps until the ratio error of the LPVT is negligible.

Embodiments described herein provide, among other things, a system for calibrating a low-power voltage transformer (LPVT). In one example, the system includes a capacitive voltage divider and a variable capacitance device connected to the capacitive voltage divider. A parameter of the variable capacitance device is adjusted to minimize the ratio error of the LPVT.

Embodiments described herein also provide a method of calibrating a low-power voltage transformer (LPVT) system. In one example, the method includes connecting a variable capacitance device to a capacitive voltage divider of the LPVT system, measuring a ratio error of the LPVT system based on an output of the variable capacitance device, and adjusting a parameter of the variable capacitance device.

Other aspects of the disclosure will become apparent by consideration of the detailed description and accompanying drawings.

DETAILED DESCRIPTION

One or more embodiments and various aspects are described and illustrated in the following description and accompanying drawings. These embodiments and aspects are not limited to the specific details provided herein and may be modified and combined in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
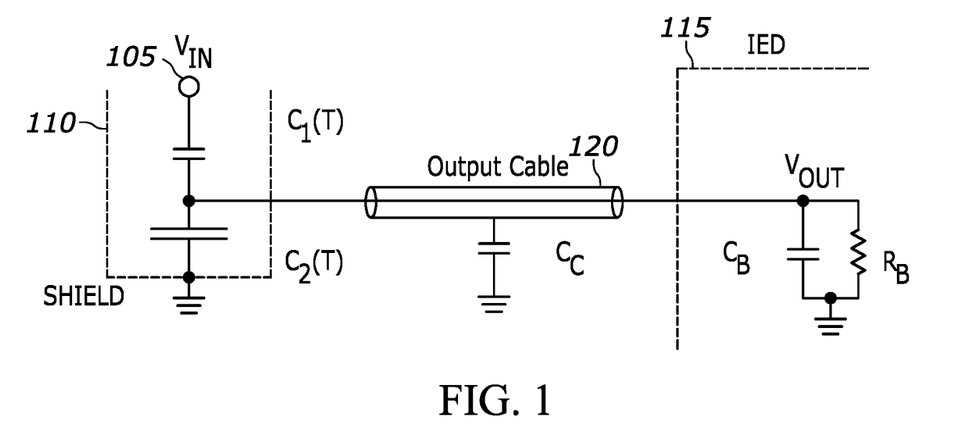
FIG. 1 is a block diagram of a general low-power voltage transformer (LPVT) system.

FIG. 1 is a block diagram of a general low-power voltage transformer (LPVT) system 100, such as a passive LPVT system. In the example, shown LPVT system 100 includes a high voltage input or high voltage electrode 105. The high voltage electrode 105 supplies input power to the LPVT system 100. In some cases, the high voltage electrode 105 is a high voltage power line in a power substation and the high voltage electrode 105 is electrically coupled to a transmission network or distribution network. In some instances, the high voltage electrode 105 supplies power in a range greater than or equal to 2.4 kV and less than or equal to 100 kV. The LPVT system 100 also includes a passive low-power voltage transformer (LPVT) 110. The LPVT 110 (also referred to as a capacitive voltage divider) is discussed further with respect to FIG. 5. The LPVT system 100 also includes a voltmeter 115. The voltmeter 115 includes a burden capacitor (CB) and a burden resistor (RB) connected in parallel to the burden capacitor (CB). The voltage of the LPVT system 100 can be measured across the burden capacitor (CB) and the burden resistor (RB). The LPVT system 100 also includes an output cable circuit 120 connecting the LPVT 110 to the voltmeter 115. The output cable circuit 120 includes a parasitic capacitance value $C_C$. The parasitic capacitance value represents a capacitance that is created by the proximity of the components of the LPVT system 100 and should be accounted for when calibrating the LPVT system 100.

In the LPVT system 100, the LPVT 110 is configured to reduce the voltage of the high voltage power supplied by the high voltage electrode 105 to a range measurable by a voltmeter 115. The LPVT 110 has a reduction factor (LPVT ratio, k). In general, the LPVT 110 has a nominal reduction factor determined by the design of the LPVT 110 that is stated or declared by the manufacturer of the LPVT 110 (rated ratio, $k_{rated}$), and a real or actual reduction factor that is also stated or declared by the manufacturer of the LPVT 110 (real ratio, $k_{real}$). The LPVT 110 also includes an accuracy class defined as the maximum measurement error of the LPVT 110 with respect to the rated ratio. The accuracy class of the LPVT 110 is, in general, limited by geometrical tolerances of parts of the LPVT 110 or by the tolerance of passive components of the LPVT 110. To overcome this limit, the LPVT 110 is provided with a ratio correction factor (CF) determined by equation (1):

$$k_{real} = k_{rated} \times CF \quad (1)$$

In some embodiments, the ratio correction factor is set in the voltmeter 115 in order to scale the output of the LPVT 110 and increase measurement accuracy.

Figure 2:
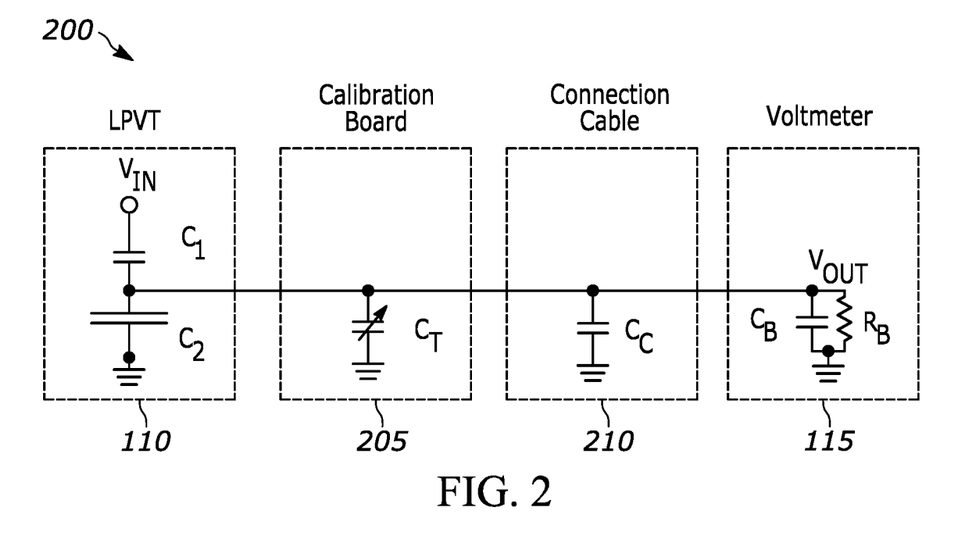
FIG. 2 is a block diagram of a system for calibrating an LPVT system.

FIG. 2 is a block diagram of a calibration system 200 for calibrating an LPVT system (for example, LPVT system 100). In some embodiments, the calibration system 200 includes the LPVT 110 and the voltmeter 115 of the LPVT system 100, with one or more additional intervening components. For example, in one instance the calibration system 200 includes a calibration board 205 (or more broadly, a variable capacitance device) that includes one or more variable capacitors, and a connection cable 210 connecting the variable capacitance device 205 to the voltmeter 115. The variable capacitance device 205 includes a variable capacitance ($C_T$) for compensating the geometrical deviations and component deviations of the LPVT 110. In one example, the reduction ratio (k) of the calibration system 200 is determined by equation (2):

$$k = \frac{C_2 + \Delta_{C2} + C_C + C_T + \widetilde{C_B} + C_1 + \Delta_{C1}}{C_1 + \Delta_{C1}} \quad (2)$$

In equation (2), the following variables are used: a rated capacitance for a first LPVT capacitor, $C_1$; a deviation of the first LPVT capacitor, $\Delta_{C1}$; a rated capacitance for a second LPVT capacitor, $C_2$; a deviation of the second LPCT capacitor, $\Delta_{C2}$; a parasitic capacitance of the connection cable 210, $C_C$; a variable capacitance of the variable capacitance device 205, $C_T$; and an equivalent input capacitance of the voltmeter 115 (including an effect of a resistive component of the voltmeter 115), $\widetilde{C_B}$. The reduction ratio may also be determined by a simpler equation, equation (3):

$$k = \frac{V_{in}}{V_{out}} = \frac{C_2}{C_1} \quad (3)$$

Ideally, the variable capacitance of the variable capacitance device 205 adjusts the real ratio ($k_{real}$) of the calibration system 200 so that $k_{real}$ is equal to $k_{rated}$. In doing so, the need of the LPVT correction factor is reduced or eliminated. There are many possible methods for setting the variable capacitance of the variable capacitance device 205. In some cases, a ratio error ($\epsilon$), which can be used to ensure proper functionality of the LPVT system 100, is determined by equation (4):

$$\epsilon = \frac{k_{rated} - k_{real}}{k_{real}} \quad (4)$$

In some embodiments, the variable capacitance of the variable capacitance device 205 is determined by first determining a total secondary capacitance of the calibration system 200 ($C_{2M}$), for example, as determined by equation (5):

$$C_{2M} = C_2 + \Delta_{C2} + C_C \quad (5)$$

The total secondary capacitance of the calibration system 200 can also be measured by an LCR meter. Once $C_{2M}$ is known, the ratio of the LPVT 110 without the variable capacitance device 205 ($k_{LPVT}$) can be measured, and the value of the first LPVT capacitor can be determined by equation (6):

$$C_1 + \Delta_{C1} = \frac{C_2 + \Delta_{C2} + C_C + \vec{C}_R'}{k_{LPVT}} = \frac{C_{2M} + \vec{C}_R'}{k_{LPVT}} \quad (6)$$

Finally, the variable capacitance of the variable capacitance device 205 can be determined by equation (7):

$$C_T = k_{rated} \times (C_1 + \Delta_{C1}) - (C_2 + \Delta_{C2} + C_C + \vec{C}_R') = \\ \frac{k_{rated}}{k_{LPVT}} \times (C_{2M} + \vec{C}_R') - (C_{2M} + \vec{C}_R') \quad (7)$$

In some embodiments, the value of $C_1 + \Delta_{C1}$ is measured rather than calculated by equation (6). In some embodiments, the value of $k_{LPVT}$ is measured with the variable capacitance device 205 at a well-known value.

In other embodiments, the variable capacitance of the variable capacitance device 205 is determined empirically by an iterative operation. In each iteration, a target value for $C_T$ is calculated using an estimation of $C_{2M}$, or by an optimization technique such as linear optimization, Lagrange optimization, decomposition optimization, dynamic optimization, evolutionary optimization, least-squares optimization, heuristic optimization, random optimization, or another technique. The iterative operation may continue until the ratio of the LPVT 110 ($k_{LPVT}$) falls within a prespecified range.

Figure 3A:
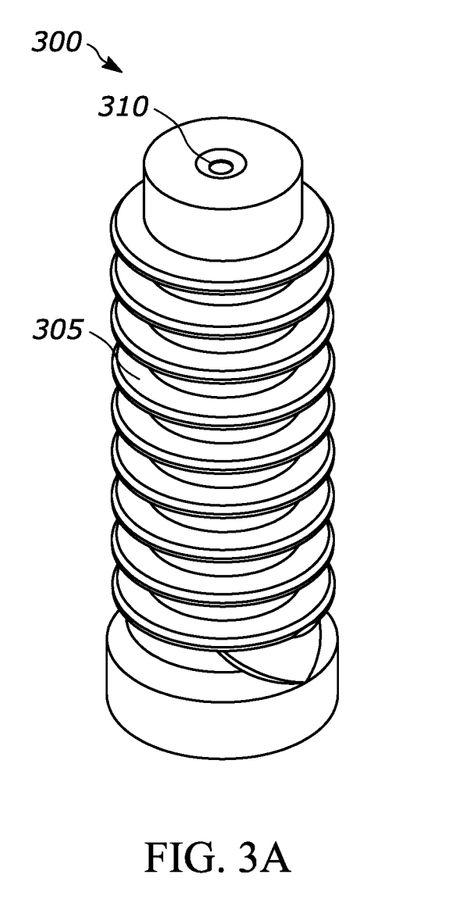
FIG. 3A is a first perspective view of a stand-alone capacitive voltage divider.
Figure 3B:
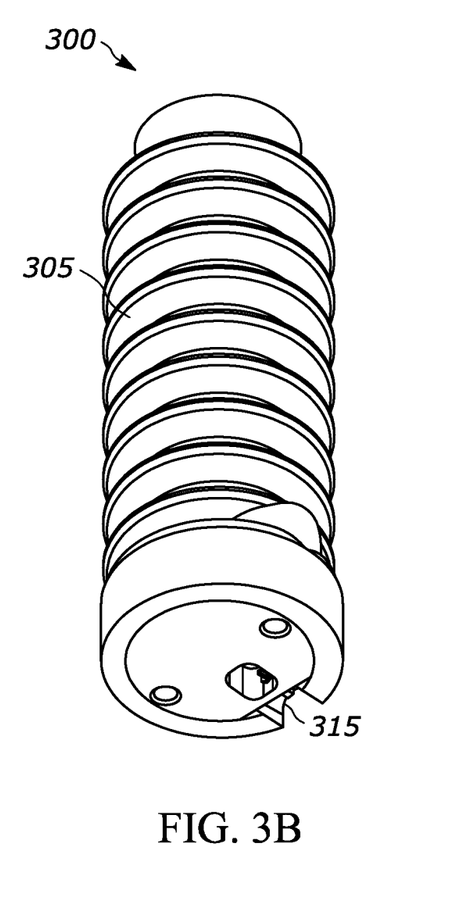
FIG. 3B is a second perspective view of a stand-alone capacitive voltage divider.

FIG. 3A illustrates a stand-alone capacitive voltage divider 300 from a first perspective. FIG. 3B illustrates the stand-alone capacitive voltage divider 300 from a second perspective. The stand-alone capacitive voltage divider 300 may be used by an LPVT system (for example, LPVT system 100) as a low-power voltage transformer (for example, LPVT 110). In the example shown, the stand-alone capacitive voltage divider 300 includes a shroud or cover 305 (or more broadly, a dielectric body), an input node 310 (shown in FIG. 3A), and an output node 315 (shown in FIG. 3B). In one instance, the stand-alone capacitive voltage divider 300 is configured such that the stand-alone capacitive voltage divider 300 receives power from a high-voltage power supply (for example, high voltage electrode 105), but is not integrated into an already existing piece of power distribution or transmission equipment.

Figure 4A:
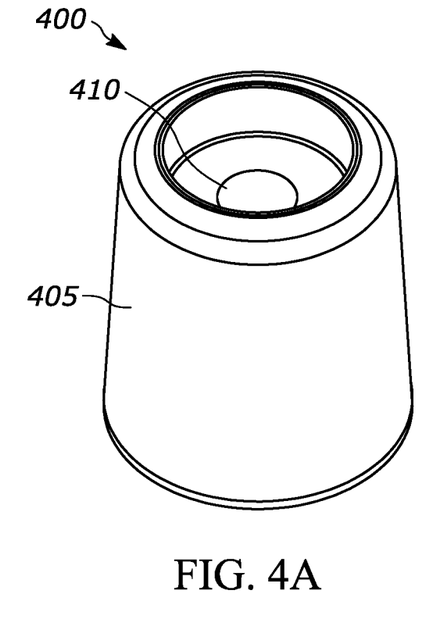
FIG. 4A is a first perspective view of an embedded capacitive voltage divider.
Figure 4B:
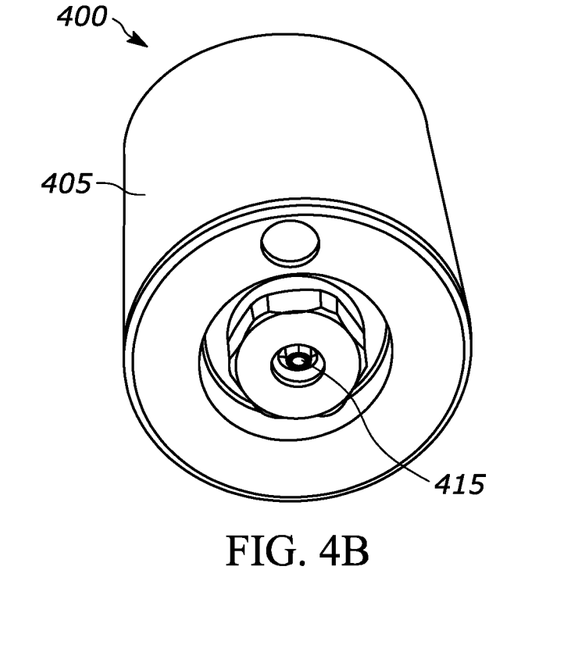
FIG. 4B is a second perspective view of an embedded capacitive voltage divider.

FIG. 4A illustrates an embedded capacitive voltage divider 400 from a first perspective. FIG. 5A illustrates the embedded capacitive voltage divider 400 from a second perspective. Unlike the stand-alone capacitive voltage divider 300, the embedded capacitive voltage divider 400 is integrated into an already existing piece of power distribution or transmission equipment. In one instance, the embedded capacitive voltage divider 400 is integrated into a back-plug of a separable connector of a power transmission network. The embedded capacitive voltage divider 400 may be used by an LPVT system (for example, LPVT system 100) as a low-power voltage transformer (for example, LPVT 110). The embedded capacitive voltage divider 400 includes a shroud or cover 405, an input node 410 (shown in FIG. 4A), and an output node 415 (shown in FIG. 5A) 410. The shroud or cover 405 may be formed from a dielectric material and may be considered a dielectric body. In one example, the embedded capacitive voltage divider 400 is configured such that the embedded capacitive voltage divider 400 receives power from a high-voltage power supply (for example, high voltage electrode 105).

Figure 5:
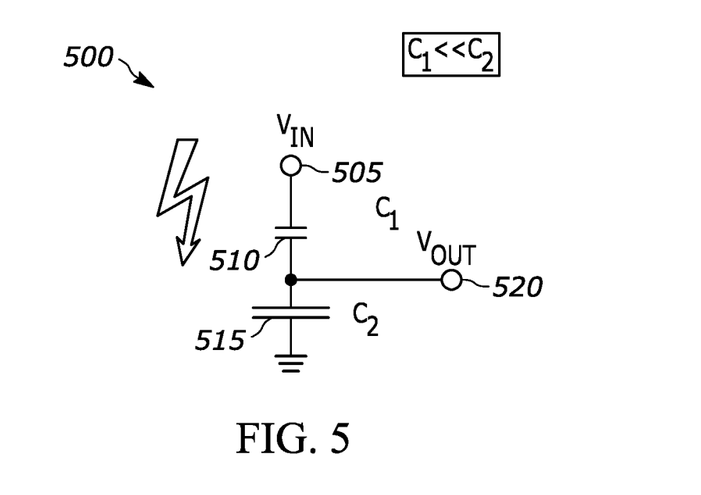
FIG. 5 is a circuit diagram of a capacitive voltage divider.

FIG. 5 is a diagram of a circuit 500 of an example capacitive voltage divider. The circuit 500 may be used in the stand-alone capacitive voltage divider 300 or embedded capacitive voltage divider 400. The capacitive voltage divider may be used as a low-power voltage transformer of a low-power voltage transformer system (for example, LPVT 110 of LPVT system 100). The circuit includes an input node 505. In some embodiments, the input node 505 receives a high-voltage power supply (for example, from the high voltage electrode 105). The circuit 500 also includes a first capacitor 510 that has a first capacitance value $C_1$. The first capacitor 510 is connected in series with a second capacitor 515, which has a second capacitance value $C_2$. In some embodiments, the first capacitance value $C_1$ is less than the second capacitance value $C_2$. The circuit 500 also includes an output node 520 between the first capacitor 510 and the second capacitor 515.

Figure 6:
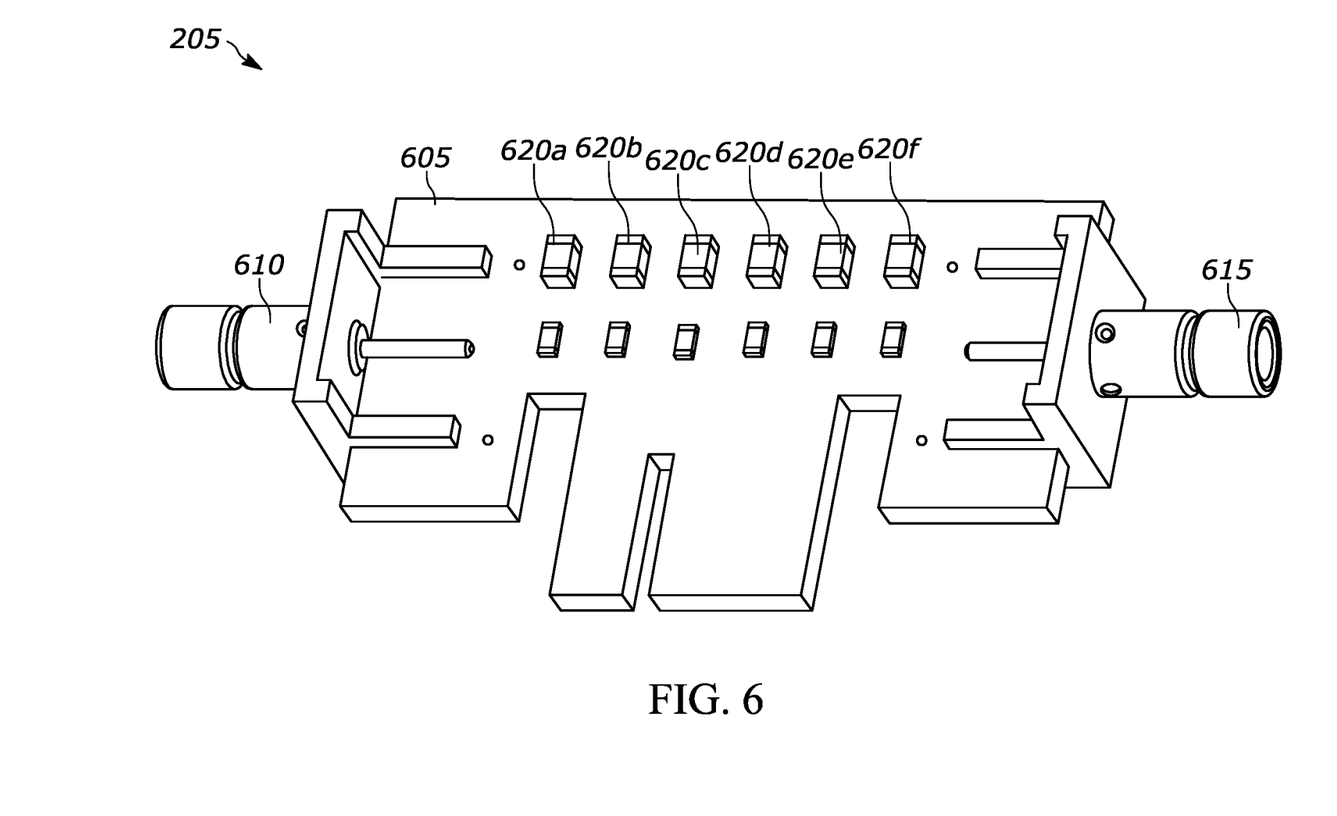
FIG. 6 is a schematic diagram of a printed circuit board (PCB) for a capacitive calibration circuit.

FIG. 6 illustrates an example calibration board 205 for use in an LPVT system (for example, LPVT system 100). The calibration board 205 includes a printed circuit board (PCB) 605 with an input node 610 and an output node 615. The calibration board also includes at least one capacitive branch 620 between the input node 610 and the output node 615. In the example illustrated by FIG. 6, the calibration board 205 includes six capacitive branches 620a-f. The capacitive branches are described in greater detail in FIGS. 7-9B.

Figure 7:
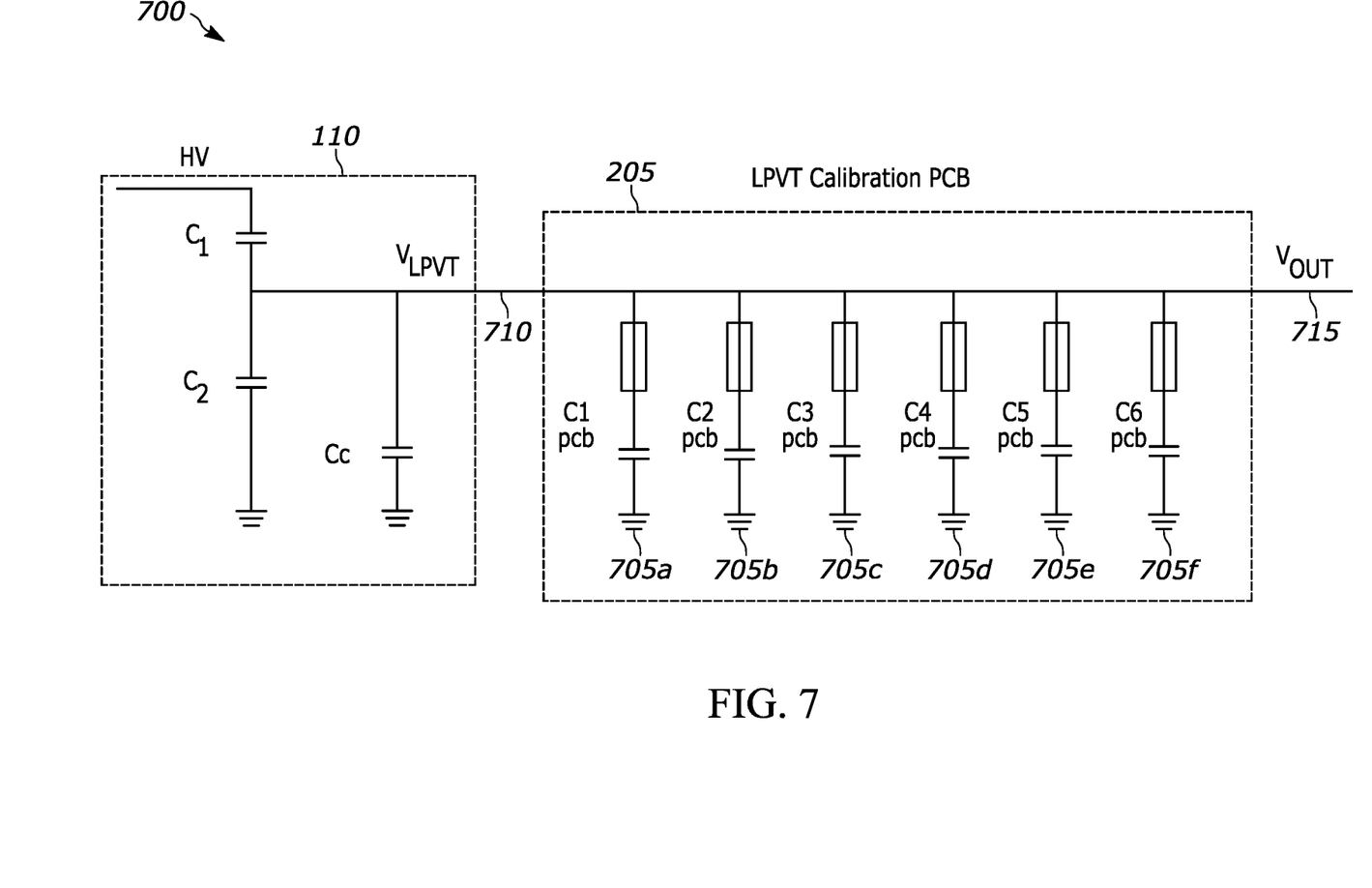
FIG. 7 is a block diagram of a capacitive calibration circuit connected to a capacitive voltage divider.

FIG. 7 is a circuit diagram of the calibration board 205 and illustrates a main circuit 700. The high voltage supply (HV) is transformed from a high voltage to a low voltage by the LPVT 110 (represented by the capacitors $C_1$ and $C_2$). The calibration board 205 receives a low voltage supply from the LPVT 110 at node $V_{LPVT}$. A parasitic capacitance from a cable connecting the LPVT 110 to the calibration board 205 is represented by capacitor ($C_C$). The calibration board 205 includes six capacitive branches 705a-f. As illustrated in FIG. 7, the voltage $V_{LPVT}$ is provided to an input 710 of the calibration board 205 and is calibrated by the six capacitive branches 705a-f. The calibration board 205 then provides a voltage output at an output 715 on a second side of the calibration board 205. In the example shown, the second side is located opposite the first side.

Figure 8:
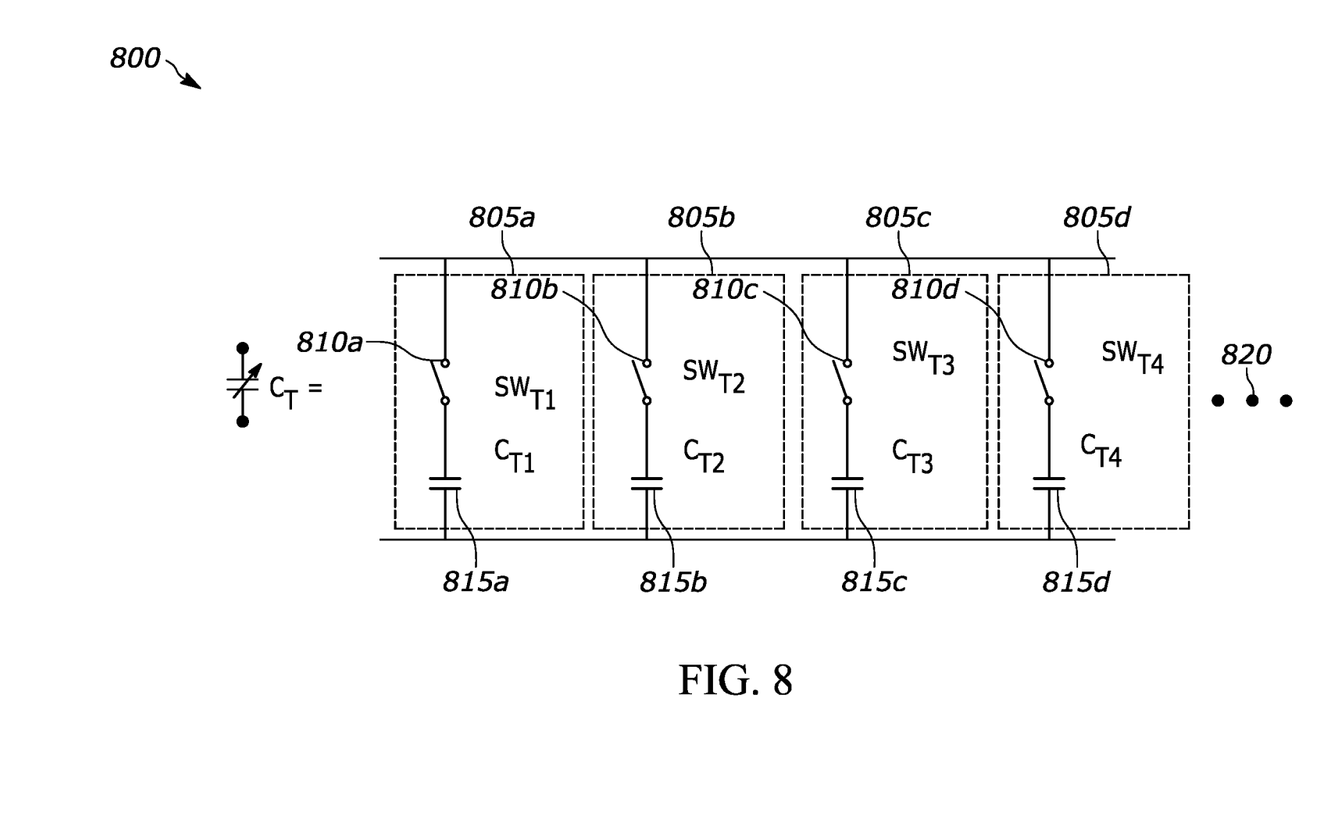
FIG. 8 is a detailed circuit diagram of a capacitive calibration circuit.

FIG. 8 is a diagram of an example calibration circuit 800 for a variable capacitance device for use in an LPVT system (for example, calibration board 205 of the LPVT system 100). The calibration circuit 800 includes one or more capacitive branches 805. For example, FIG. 8 illustrates four capacitive branches 805a-d. Each capacitive branches 805 includes a switch 810 and a capacitor 815. For example, each of the capacitive branches 805a-d includes a switch 810a-d and a capacitor 815a-d. In some embodiments, each capacitor may be set to a predetermined capacitance value. The diagram also illustrates that more capacitive branches 805 may be connected in parallel to the capacitive branches 805a-d at the continuation block 820. While the LPVT system 100 is being calibrated, one or more of the switches 810 may be opened to disconnect the corresponding capacitor 815 so that the total capacitance of the calibration circuit 800 reaches a specified value. In some embodiments, the one or more switches are opened manually. In other embodiments, the one or more switches are controlled by software, hardware, or another automated system. In some embodiments, the specified value is a value within a range of a target value, the range being an acceptable amount of error of the actual total capacitance of the calibration circuit 800. Once the actual total capacitance reaches the specified value, each of the one or more switches may be permanently opened, such as by using a non-resettable fuse, or creating an open circuit using a laser cutter or a drill, or left closed, so that the actual total capacitance is permanently recorded on the variable capacitance device 205. The number of capacitive branches 805 may be determined by a resolution and range of the target value.

For example, a calibration circuit 800 may include six capacitive branches 805. In the example shown, each capacitive branches includes a switch 810 and a capacitor 815 set to a predetermined value. The first capacitor may have a nominal capacitance of 10 nF, the second capacitor may have a nominal capacitance of 4.7 nF, the third capacitor may have a nominal capacitance of 2.2 nF, the fourth capacitor may have a nominal capacitance of 1 nF, the fifth capacitor may have a nominal capacitance of 470 pF, and the sixth capacitor may have a nominal capacitance of 220 pF, with a target total capacitance of 13 nF and an acceptable error of 0.5%. Therefore, the total capacitance should be within a range of 12.35 nF to 13.65 nF. By opening (for example, by using one of the techniques described above) the switches corresponding to the second capacitor and the fourth capacitor, the total capacitance of the variable capacitance device is 12.89 nF, which falls within the acceptable range.

In some embodiments, the positions of the switches 810 as a function of the target capacitance can be calculated by an algorithm. The total capacitance obtained by all the $2^n$ combinations of the switch 810 positions (with n being the number of capacitors 815) can be computed in advance and stored in a file in increasing order. For example, an optimization application can load the file, select the value closest to the target capacitance and turn the switches 810 accordingly.

Figure 9A:
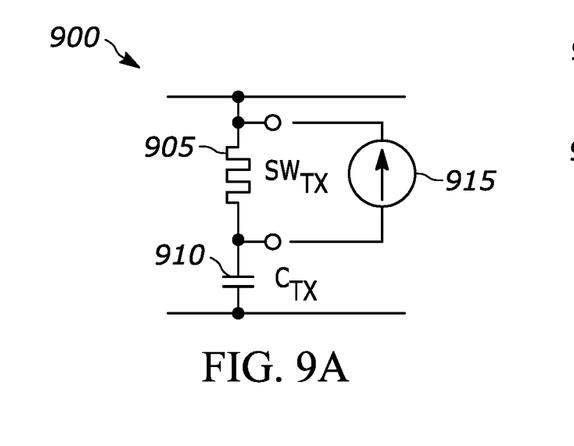
FIG. 9A is a circuit diagram of a first configuration of a disabling circuit for use in a capacitive calibration circuit.

FIG. 9A is a diagram illustrating a first circuit configuration 900 for permanently opening the switches 810 of the calibration circuit 800. In the example shown, the first circuit configuration 900 includes a fuse 905 functioning as the switch 810, a capacitor 910, and a current source 915. In the first circuit configuration 900, the fuse 905 is opened by imposing a current higher than a trip-current of the fuse 9905 on a controlled current source, such as a voltage power supply. In some embodiments, the fuse 905 is a commercial fuse. In other embodiments, the fuse 905 is a trace with reduced width.

Figure 9B:
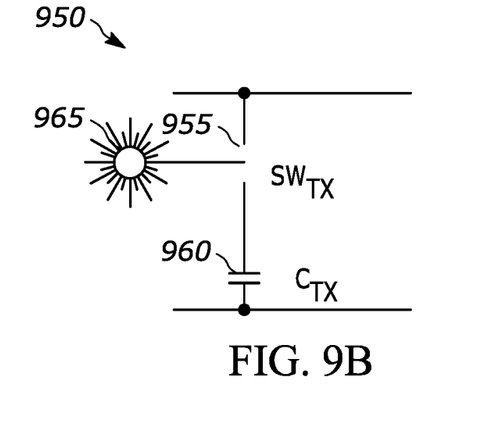
FIG. 9B is a circuit diagram of a second configuration of a disabling circuit for use in a capacitive calibration circuit.

FIG. 9B is a diagram illustrating a second circuit configuration 950 for permanently opening the switches 810 of the calibration circuit 800. In the example shown, the second circuit configuration 950 includes a switch portion 955, a capacitor 960, and a laser cutter 965. In the second circuit configuration 950, the laser cutter 965 is used to cut the connection of the capacitor 960 to the remainder of the variable capacitance device at the switch portion 955. In some embodiments, a drill is used instead of the laser cutter 965.

Figure 10A:
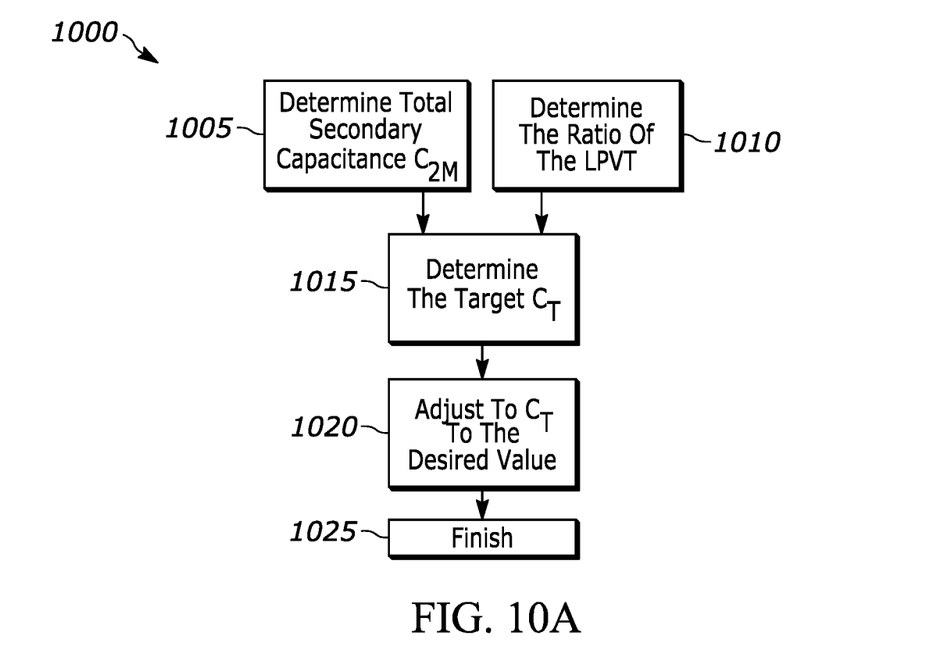
FIG. 10A is a flow chart of a first method for calibrating an LPVT with a capacitive calibration circuit.

FIG. 10A is a flow chart of a first method 1000 for calibrating an LPVT (for example, LPVT 110) with a calibration circuit (for example, calibration board 205). The method 1000 includes determining a total secondary capacitance ($C_{2M}$) of the LPVT (BLOCK 1005). In some embodiments, the total secondary capacitance is calculated based on a measured reduction ratio of the LPVT 110 dependent on a burden capacitance of the voltmeter 115. In other embodiments, the total secondary capacitance, $C_{2M}$, is measured by an LCR meter. The method 1000 also includes determining the ratio ($k_{LPVT}$) of the LPVT 110 (BLOCK 1010). In some embodiments, the ratio of the LPVT 110 is measured by a measurement instrument. In other embodiments, the ratio of the LPVT 110 is determined by equation (8), a version of equation (3) to solve for $k_{LPVT}$.

$$k_{LPVT} = \frac{C_{2M} + \widetilde{C_B}}{C_{1M}} \tag{8}$$

Equation (8) also requires the burden capacitance of the voltmeter 115, $\widetilde{C_B}$, and a total primary capacitance, $C_{1M}$, which may also be determined by an LCR meter. The method 1000 also includes determining a target total variable capacitance ($C_T$) (BLOCK 1015). The target total variable capacitance may be determined by equation (6) and equation (7). The method 1000 also includes adjusting the actual total variable capacitance ($C_T$) of the variable capacitance device so that the actual total variable capacitance is equal to the target total variable capacitance (BLOCK 1020). In some embodiments, the actual total variable capacitance of the variable capacitance device is adjusted by opening one or more switches corresponding to one or more variable capacitors, where the variable capacitors in connected in parallel with each other. The one or more switches may first be temporarily opened by a manual or an automatic method. The one or more switches may then be permanently opened. In some of these embodiments, the switches are permanently opened by a fuse. In other of these embodiments the switches are permanently opened by a laser cutter or a drill. Once the actual total variable capacitance is equal to the target total variable capacitance, the method 1000 is complete (BLOCK 1025).

Figure 10B:
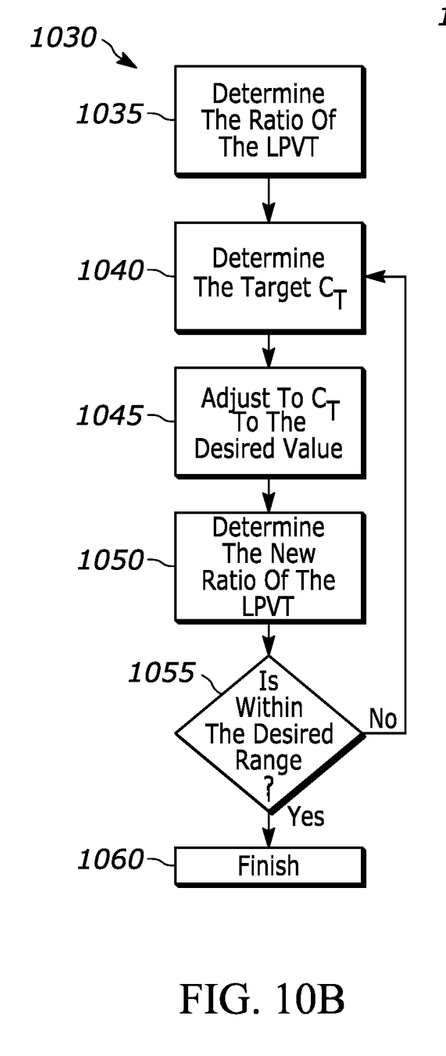
FIG. 10B is a flow chart of a second method for calibrating an LPVT with a capacitive calibration circuit.

FIG. 10B is a flow chart of a second method 1030 for calibrating an LPVT (for example, LPVT 110) with a calibration circuit (for example, calibration board 205). The method 1030 includes determining the ratio ($k_{LPVT}$) of the LPVT (BLOCK 1035). In some embodiments, the ratio of the LPVT is measured by a measurement instrument.

The method 1030 also includes determining a target total variable capacitance ($C_T$) (BLOCK 1040). The target total variable capacitance may be determined by equation (6) and equation (7), in which the total secondary capacitance is an estimated starting value. The method 1030 also includes adjusting the actual total variable capacitance so that the actual total variable capacitance is equal to the target total variable capacitance (BLOCK 1045). In some embodiments, the actual total variable capacitance of the variable capacitance device is adjusted by opening one or more switches corresponding to one or more variable capacitors, where the variable capacitors are connected in parallel with each other. In some of these embodiments, the switches are opened by a fuse. In other of these embodiments, the switches are opened by a laser cutter or a drill. Once the actual total variable capacitance is equal to the target total variable capacitance, the method includes determining a new ratio of the LPVT (BLOCK 1050). The ratio may be determined by equation (8). The method 1030 also includes determining whether the new ratio is within a desired range of a target ratio (BLOCK 1055). The desired range may be within 0.5% of the target ratio. If the new ratio is within the desired range, the method 1030 ends (BLOCK 1060). Otherwise, in the example shown, the method 1030 returns to BLOCK 1040.

Figure 10C:
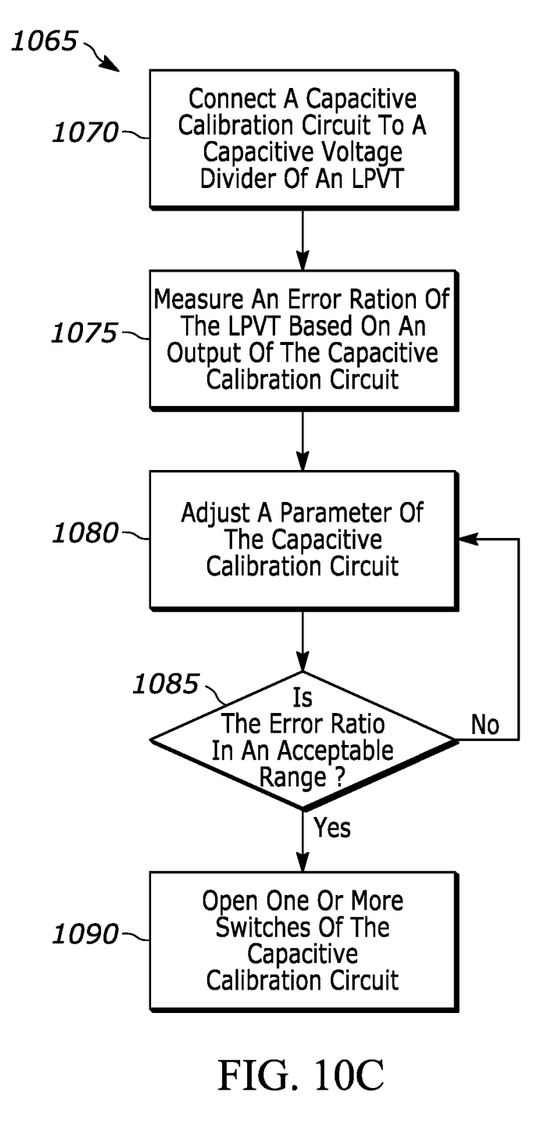
FIG. 10C is a flow chart of a simplified method for calibrating an LPVT with a capacitive calibration circuit.

FIG. 10C is a flow chart of a simplified method 1065 for calibrating an LPVT system (for example, LPVT system 100) with a capacitive calibration circuit (for example, calibration board 205). The method includes connecting the capacitive calibration circuit including one or more variable capacitors connected to one or more switches to a capacitive voltage divider (for example, LPVT 110) of the LPVT system 100 (BLOCK 1070). A supply voltage from a high-voltage electrode is received via the capacitive voltage divider. In some embodiments, the method 1065 includes connecting, in series, each of the one or more switches to one of the one or more variable capacitors. A first switch of the one or more switches connected in series to a first variable capacitor of the one or more variable capacitors is connected in parallel to a second switch of the one or more switches connected in series to a second variable capacitor of the one or more variable capacitors.

The method 1065 also includes measuring a ratio error of the LPVT system based on an output of the capacitive calibration circuit (BLOCK 1075). The ratio error may be measured based on equation (4). The method 1065 also includes adjusting a parameter of the capacitive calibration circuit (BLOCK 1080). In some embodiments, the parameter is a total capacitance of the capacitive calibration circuit. The method 1065 also includes determining whether the ratio error of the LPVT system has crossed an acceptable ratio error threshold (BLOCK 1085). The acceptable ratio error threshold is a range in which the ratio error (e.g., the ratio between a reduction factor of the LPVT system rated by the manufacturer, and the actual reduction factor of the LPVT system) is within a certain acceptable error range. For example, an acceptable error range may be ±0.5%.

If the ratio error has not crossed the acceptable ratio error threshold, the method 1065 returns to BLOCK 1080. Otherwise, the method 1065 includes opening the one or more switches of the capacitive calibration circuit (BLOCK 1090). Opening the one or more switches may include opening a number of the one or more switches based on a target total capacitance value. The one or more switches may first be opened temporarily to test combinations of the variable capacitors. Once a set of variable capacitors that creates a target total capacitance has been identified, the one or more switches may be opened permanently. In some embodiments, permanently opening the one or more switches includes applying or providing, to a fuse coupled to each of the one or more switches, a current higher than a trip current of the fuse. Thus, the fuse will trip, and the switch will open. In other embodiments, permanently opening the one or more switches includes severing, with at least one selected from a group consisting of a laser cutter and a drill, a portion of each of the one or more switches. The method 1065 also includes setting each of the one or more variable capacitors to a predetermined capacitance value and adjusting the parameter of the capacitive calibration circuit by opening a number of the one or more switches connected to one or more variable capacitors.

Figure 11:
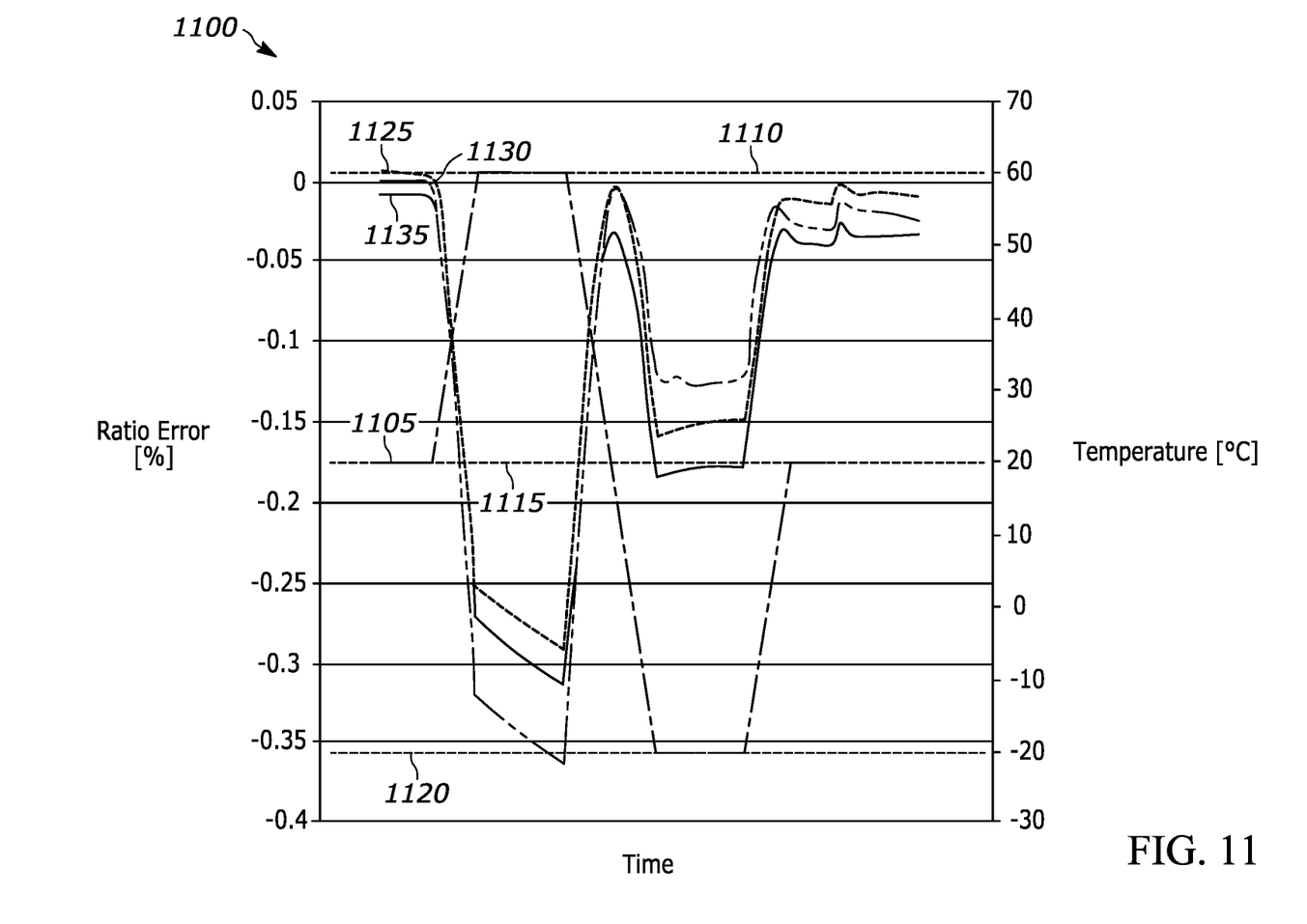
FIG. 11 is a graph illustrating a test case and rest results for testing an accuracy of the LPVT calibration system.

FIG. 11 is a graph 1100 illustrating a test case and testing results for testing accuracy of the LPVT system 100 at various operating temperatures over a calibration period of an LPVT (for example, LPVT 110). The graph 1100 illustrates time on the x-axis and air temperature on the y-axis. The x-axis also shows instants where accuracy of the LPVT ratio is measured. The graph 1100 also includes a line 1105 representing air temperature over time. The graph also includes a first threshold 1110 representing a high testing temperature, a second threshold 1115 representing an ambient testing temperature, and a third threshold 1120 representing a low testing temperature. Results of the accuracy of the LPVT system 100 during this test case are shown by a first line 1125, a second line 1130, and a third line 1135, each representing a testing ratio error of three different example LPVT systems 100. The ratio error of each of the three example LPVT systems 100 is within a range of [0.5%, −0.5%], within the acceptable error range.

Various features and advantages of the embodiments and aspects described herein are set forth in the following claims.

What is claimed is:

1. A system for calibrating a low-power voltage transformer (LPVT), the system comprising:
    a capacitive voltage divider; and
    a variable capacitance device connected to the capacitive voltage divider;
    wherein a parameter of the variable capacitance device is adjusted to minimize the ratio error of the LPVT,
    wherein the capacitive voltage divider is a stand-alone capacitive voltage divider or is an embedded capacitive voltage divider.

2. The system of claim 1, further comprising a voltmeter configured to measure an output signal from the variable capacitance device, and wherein a ratio error of the LPVT is determined based on a measurement of the voltmeter.

3. The system of claim 1, wherein the variable capacitance device includes one or more capacitive branches connected in parallel.

4. The system of claim 3, wherein each capacitive branch includes a capacitor and a switch, and wherein, in response to the ratio error of the LPVT crossing an acceptable ratio error threshold, one or more switches of the one or more capacitive branches are permanently opened.

5. The system of claim 4, further comprising one or more fuses, and wherein each switch of the one or more capacitive branches is coupled to one of the one or more fuses.

6. The system of claim 5, wherein the one or more switches are opened by imposing, on each of the one or more fuses, a current higher than a trip current of the fuse.

7. The system of claim 4, wherein one or more switches of the one or more capacitive branches are permanently opened by severing, with one selected from a group of a laser cutter and a drill, a portion of the one or more switches.

8. The system of claim 4, wherein each capacitor of the one or more capacitive branches is set to a predetermined capacitance value, and the parameter of the variable capacitance device is adjusted by opening a number of the switches connected to the capacitors.

9. The system of claim 8, wherein the number of the switches is based on a target total capacitance value.

10. The system of claim 1, wherein the capacitive voltage divider includes a first capacitor and a second capacitor, and wherein a capacitance value of the second capacitor is greater than a capacitance value of the first capacitor.

11. A method of calibrating a low-power voltage transformer (LPVT) system, the method comprising:
    connecting a variable capacitance device to a capacitive voltage divider of the LPVT system;
    measuring a ratio error of the LPVT system based on an output of the variable capacitance device; and
    adjusting a parameter of the variable capacitance device wherein the capacitive voltage divider is a stand-alone capacitive voltage divider or is an embedded capacitive voltage divider.

12. The method of claim 11, wherein the variable capacitance device includes one or more capacitive branches connected in parallel.

13. The method of claim 12, wherein each capacitive branch includes a capacitor and a switch, and the method further comprises, in response to the ratio error of the LPVT crossing an acceptable ratio error threshold, permanently opening one or more switches of the one or more capacitive branches.

14. The method of claim 13, wherein opening the one or more switches of the one or more capacitive branches includes imposing, on a fuse coupled to each of the one or more switches, a current higher than a trip current of the fuse.

15. The method of claim 13, wherein opening the one or more switches of the one or more capacitive branches includes severing, with at least one selected from a group consisting of a laser cutter and a drill, a portion of each of the one or more switches.

16. The method of claim 13, further comprising:
setting each capacitor of the one or more capacitive branches to a predetermined capacitance value; and
adjusting the parameter of the variable capacitance device by opening a number of the switches connected to the capacitors.

17. The method of claim 13, wherein opening the switches includes opening a number of the switches based on a target total capacitance value.

18. The method of claim 13, further comprising receiving, with the capacitive voltage divider, a supply voltage from a high-voltage electrode.

\* \* \* \* \*